(12) United States Patent
Green et al.

(10) Patent No.: US 8,677,408 B2
(45) Date of Patent: Mar. 18, 2014

(54) ADVERTISEMENTS FOR USE IN A PROGRAM GUIDE

(75) Inventors: David P. Green, Castaic, CA (US); Joy A. Arai, Palos Verdes Peninsula, CA (US); Scott M. Benoit, Los Angeles, CA (US); Eric J. Bennett, Los Angeles, CA (US); Robert A. Bergman, Redondo Beach, CA (US); Tommi Iten, Redondo Beach, CA (US); Chris Roy, Los Angeles, CA (US); Tyson L. Wintibaugh, Marina del Rey, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 907 days.

(21) Appl. No.: 11/832,073

(22) Filed: Aug. 1, 2007

(65) Prior Publication Data

US 2009/0037955 A1    Feb. 5, 2009

(51) Int. Cl.
*G06F 3/00*    (2006.01)

(52) U.S. Cl.
USPC .................. 725/42; 725/32; 725/39; 725/40; 725/41; 725/47

(58) Field of Classification Search
USPC .................................................... 725/39, 42
See application file for complete search history.

(56) References Cited

U.S. PATENT DOCUMENTS

| | | | |
|---|---|---|---|
| 6,177,931 B1* | 1/2001 | Alexander et al. | 725/52 |
| 6,756,997 B1* | 6/2004 | Ward et al. | 725/42 |
| 6,934,963 B1* | 8/2005 | Reynolds et al. | 725/42 |
| 2003/0122878 A1* | 7/2003 | Schlarb et al. | 345/826 |
| 2003/0146940 A1* | 8/2003 | Ellis et al. | 345/811 |
| 2003/0177498 A1* | 9/2003 | Ellis et al. | 725/60 |
| 2004/0045025 A1* | 3/2004 | Ward et al. | 725/42 |
| 2004/0148628 A1* | 7/2004 | Mears | 725/42 |
| 2006/0288366 A1* | 12/2006 | Boylan et al. | 725/42 |

* cited by examiner

*Primary Examiner* — Brian Pendleton
*Assistant Examiner* — Cai Chen (57) ABSTRACT

Row advertisements for use in a program guide are described. An example includes a program guide to aid a user navigate a media presentation system; a list of entries to represent a plurality of programs; an advertisement positioned within the list of entries, wherein the advertisement is interactive to allow a user to manipulate the advertisement, and wherein the advertisement is associated with one of the plurality of programs.

19 Claims, 5 Drawing Sheets

ADVERTISEMENTS FOR USE IN A PROGRAM GUIDE

FIELD OF THE DISCLOSURE

The present disclosure relates generally to program guides and, more particularly, to advertisements for use in a program guide.

BACKGROUND

Media presentation systems may include a guide or tool to assist a user in parsing or searching through available content. Typically, the guide is implemented via an on-screen list or menu. The guide may indicate what programs, movies, music, or other events are scheduled for broadcast at certain times. A user may manipulate such a guide to determine upcoming or current programming by moving a cursor through the guide via a remote control or similar input device.

DETAILED DESCRIPTION

Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

The example methods and apparatus described herein may be used to present an advertisement within a program guide of a media presentation system such as, for example, a home entertainment system including a media signal decoder (e.g., a set-top-box, a receiver, etc.) and a television or other media presentation device (e.g., a computer monitor). Moreover, the advertisement described herein may be interactive to allow a user to manipulate a user interface associated with the content delivery system.

The example methods and apparatus described herein to present an advertisement within a program guide may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following disclosure is made with respect to example DIRECTV® services and systems, it should be understood that many other delivery systems are readily applicable to the disclosed methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and fiber optic networks.

Figure 1:
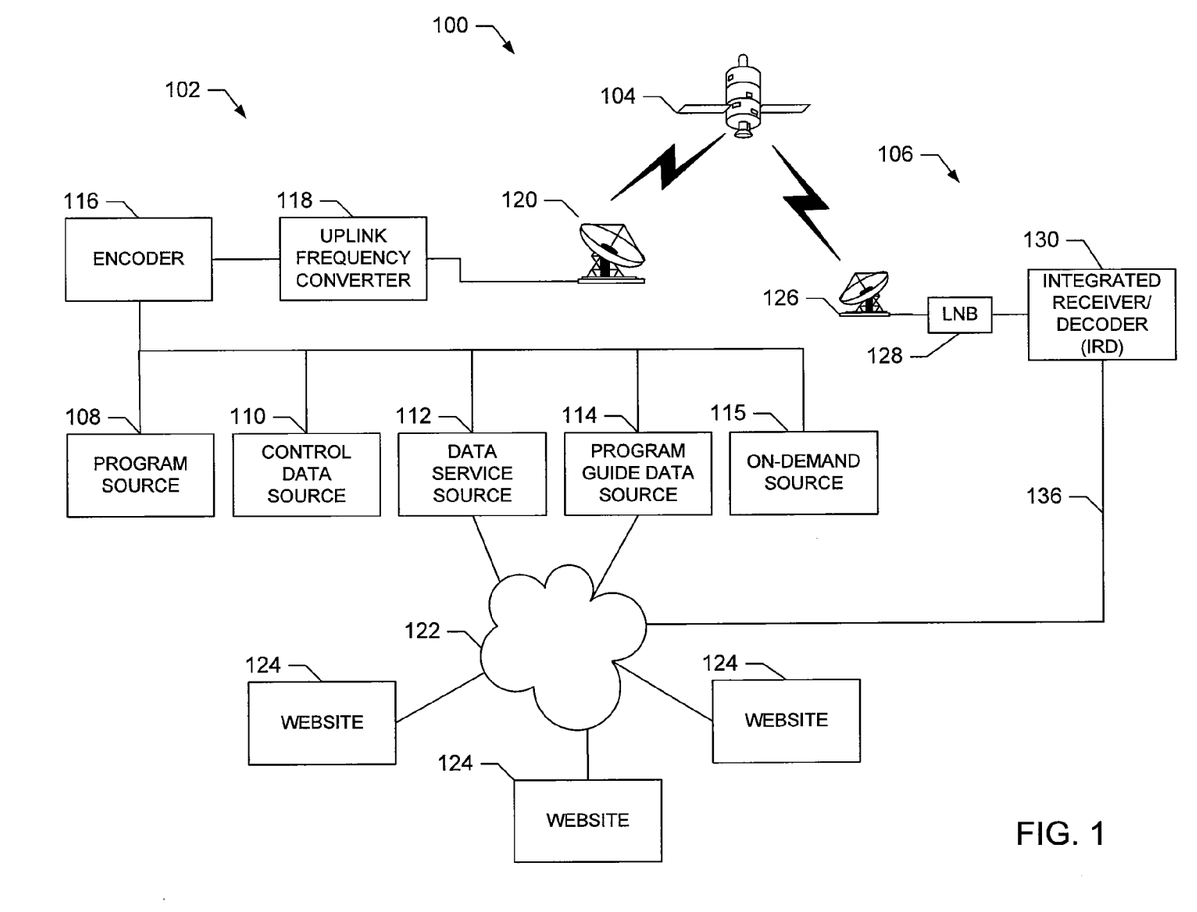
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136.

In further detail, the example transmission station 102 of the example system of FIG. 1 includes a plurality of sources of data and/or information (e.g., program sources 108, a control data source 110, a data service source 112, one or more program guide data sources 114, and an on-demand source 115). During operation, information from one or more of these sources 108-115 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., an remote control). For example, a cursor may be moved to highlight a program description within the guide. A user may then select a highlighted program description via the input device to navigate to associated content (e.g., an information screen containing a summary of a television show episode). As described further below, the receiver station 106 may also gather information regarding advertisements to be placed in a program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Figure 2:
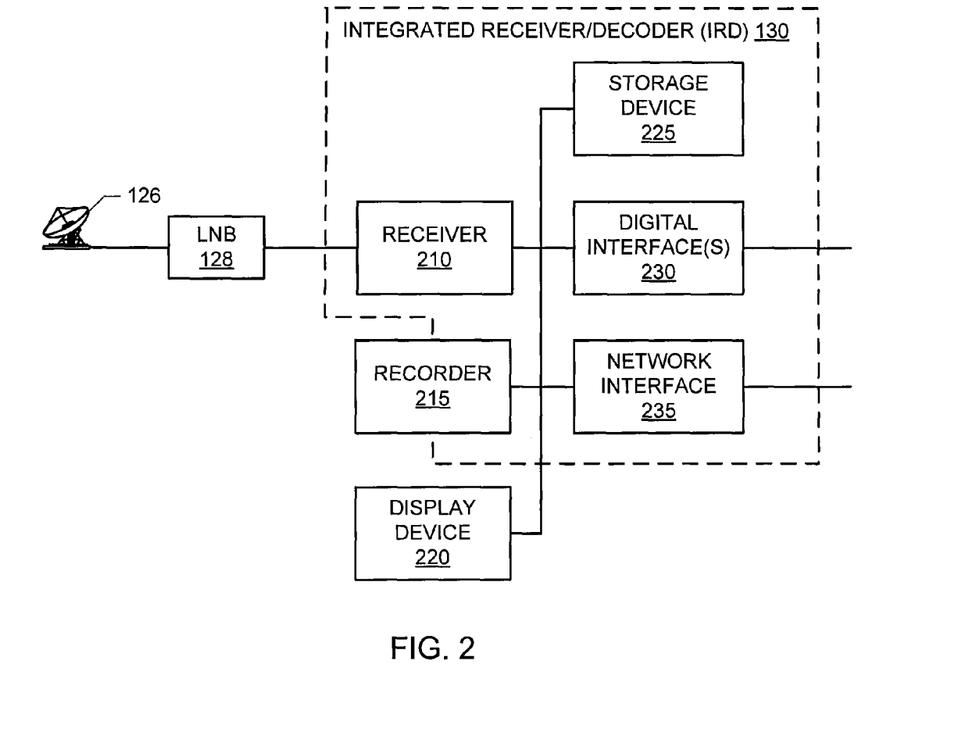
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

As described above, a program guide and/or user interface may be provided to facilitate an interaction between a user and a content delivery system. In general, a user may utilize the program guide as an information source and/or as a tool to improve the manipulation of the user interface. For example, a user interface may present an on-screen list or schedule of programs that may be navigated via an input device (e.g., a remote control). An entry in the list may be highlighted and/or selected to activate a feature (e.g., a program information screen, a recording process, a future showing list, etc.) of the user interface. Further, in the examples described below in connection with FIGS. 3 and 4, an advertisement may be included in the program guide in a similar manner as a program entry.

Figure 3:
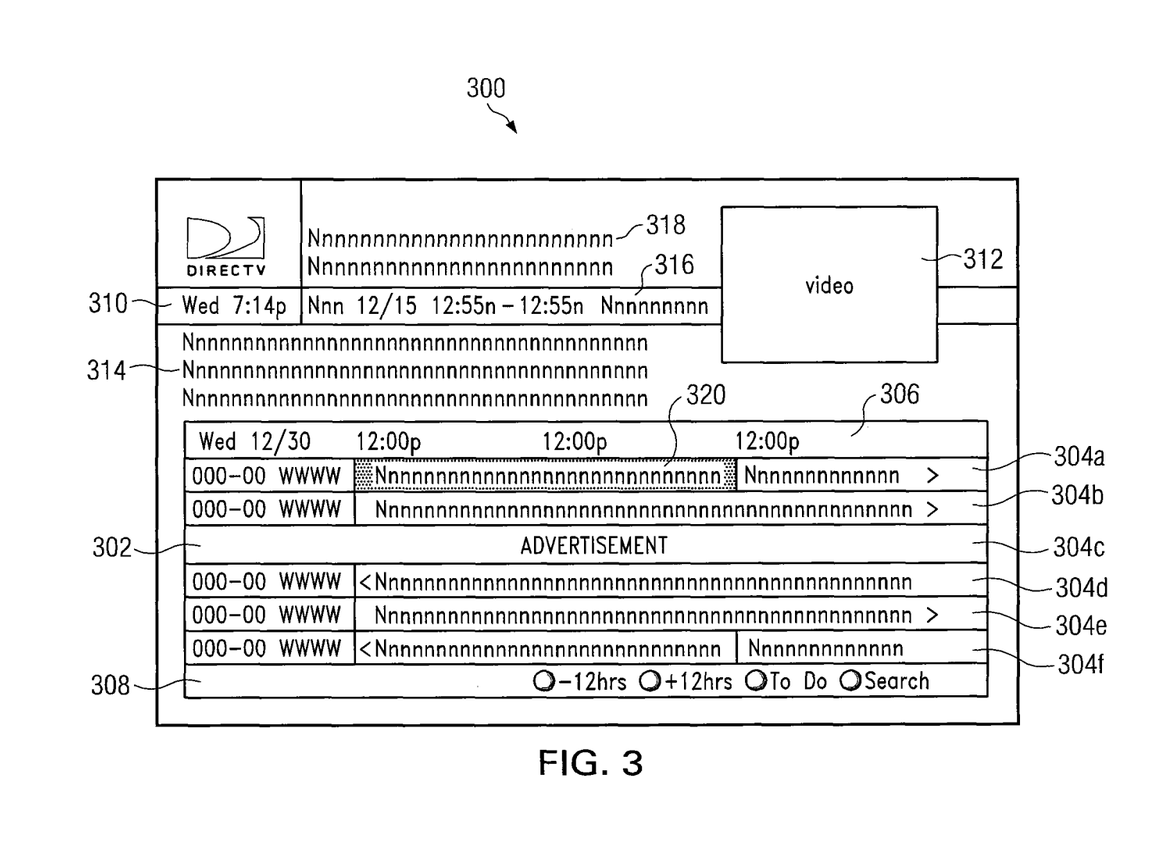
FIG. 3 shows an example program guide including an example row advertisement.

FIG. 3 shows an example program guide 300 including an example row advertisement 302. In this example, the program guide 300 includes a list 304 of entries, a time indicator 306, a button bar 308, a current date and time section 310, a video section 312, an information section 314, a program schedule bar 316, and a title section 318. However, the program guide 300 is only one example that may vary in arrangement, shape, number of sections, type of information, etc. Such a program guide 300 may be designed and/or implemented, for example, by the administrators of the content delivery system (e.g., DIRECTV® programmers).

Each line in the list 304 may represent a channel's scheduled programming for the time period shown in the time indicator 306. The time indicator 306 may be set, for example, in 30 minutes increments or any other suitable duration. A user may shift the displayed time period (and thus the corresponding entries of the list 304) via an input device using a set of keys that move a cursor within the program guide. Additionally or alternatively, the button bar 308 may be used to shift the time period of the time indicator 306. The button bar 308 may include graphics and/or text to indicate an operation corresponding to a button on an input device (e.g., an IR remote control). For example, the dots shown on the button bar 308 may be different colors to correspond to a same color button on an input device. By way of illustration, the operations shown on the button bar 308 of FIG. 3 are '−12 hrs,' '+12 hrs,' 'To Do,' and 'Search.' The corresponding buttons on the input device support a one-touch functionality that allows the same button to be used for multiple one-touch functions on different screens of the user interface. Here, the first button (i.e., the '−12 hrs' button) may be red and may correspond to an operation that shifts the time indicator 306 and, thus, the program list 304 to 12 hours earlier than the currently displayed time period. Conversely, the second button (i.e., the +12 hrs button) may correspond to an operation that shifts the time indicator 306 and the program list 304 to 12 hours later than the currently displayed time period. Further, the current date and time section 310 may be referenced when navigating through the program guide 300.

The video section 312 may include a display of the channel to which the system is currently tuned, or the recorded content currently being played back. The video section 312 allows a user to continue viewing broadcast or recorded content while navigating through the program guide 300. For example, if a user is viewing a live baseball game and navigates (e.g., by engaging a button on an input device) to the program guide 300, the video section 312 displays the baseball game. In another example, if a recording of a movie is currently being played and a user navigates to the program guide 300, the video section 312 displays the recorded movie, allowing the user to simultaneously examine the program guide 300 and watch the recorded content. The video section 312 may also present alternative content (e.g., an advertisement or promotion) as determined by, for example, the administrators of the content delivery system (e.g., DIRECTV® programmers) or the user.

The information section 314, program schedule bar 316, and title section 318 display information associated with, for example, a currently highlighted list entry 320. As mentioned above, the user may highlight such an entry via navigation buttons on an input device. The information section 314 may include a description of a television show, a list of lead actors, purchase information, duration information, a plot summary, etc. The program schedule bar 316 may indicate the date, time, and duration of the currently highlighted list entry 320. The title section 318 may include the title of a program, a channel, mode of operation, etc.

The advertisement 302 may be a graphical or textual object designed by, for example, a content delivery system (DIRECTV®) programmer or a content provider (e.g., a broadcasting company). Where the advertisement 302 is designed by a content provider, the content delivery system programmer may make adjustments to tailor the advertisement 302 to comply with system parameters (e.g., size or shape of the graphic). The advertisement 302 may be positioned in a variety of locations in the program guide 300 for a variable duration of time. Additionally, the placement and duration of the advertisement 302 may be achieved via a variety of methods. In one example, the advertisement 302 may be accompanied by a plurality of flags or indicators (e.g., sections of data in the header of a packet) in transmission (e.g., over the system 100 described in connection with FIG. 1) to a presentation system (e.g., a set-top-box). The flags may instruct the presentation system regarding the placement and/or duration of the advertisement 302. The advertisement 302 may be positioned in one of the entries (e.g., entry 304c as shown in FIG. 3) of the list 304. This position (e.g., in entry 304c) may be maintained (e.g., never move from the top or bottom entry of the list 304) despite any scrolling, channel changing, or other navigation performed by the user. Additionally or alternatively, the position of the advertisement 302 may depend on the position of another entry. For example, the advertisement 302 may be associated with one of the programs in the list 304 and placed adjacent (e.g., above or below) to the associated program. In such an example, the advertisement 302 may be configured to scroll along with the program (e.g., remain one entry below or above the program) to which it is associated. In other words, the advertisement 302 may be linked to a program or a channel in regards to content and/or relative positioning. Alternatively, the advertisement 302 may completely replace the entry or program to which it is associated. Furthermore, when the advertisement 302 is linked to a program or channel that is inaccessible to a particular user (e.g., the user does not subscribe to the channel on which the program is broadcast), the advertisement may, for example, be omitted from the program guide. Such an advertisement 302 may also be replaced by a message urging or recommending that the user make the program accessible (e.g., by subscribing to the channel). Also, the advertisement 302 may be positioned in a hot spot of the program guide 300 that is visited or viewed more often than others. The hot spot may be determined by the content delivery system provider or the user.

As mentioned above, the duration of the advertisement 302 may also be manipulated. In some examples, the advertisement 302 may expire (e.g., via the flags and indicators described above) after an episode or movie has been broadcast or presented. Such an advertisement 302 may be replaced with an updated version to reflect current or upcoming programming or removed from the program guide 300 altogether. Alternatively, the advertisement 302 may be replaced or changed each time a user accesses the program guide 300.

Figure 4:
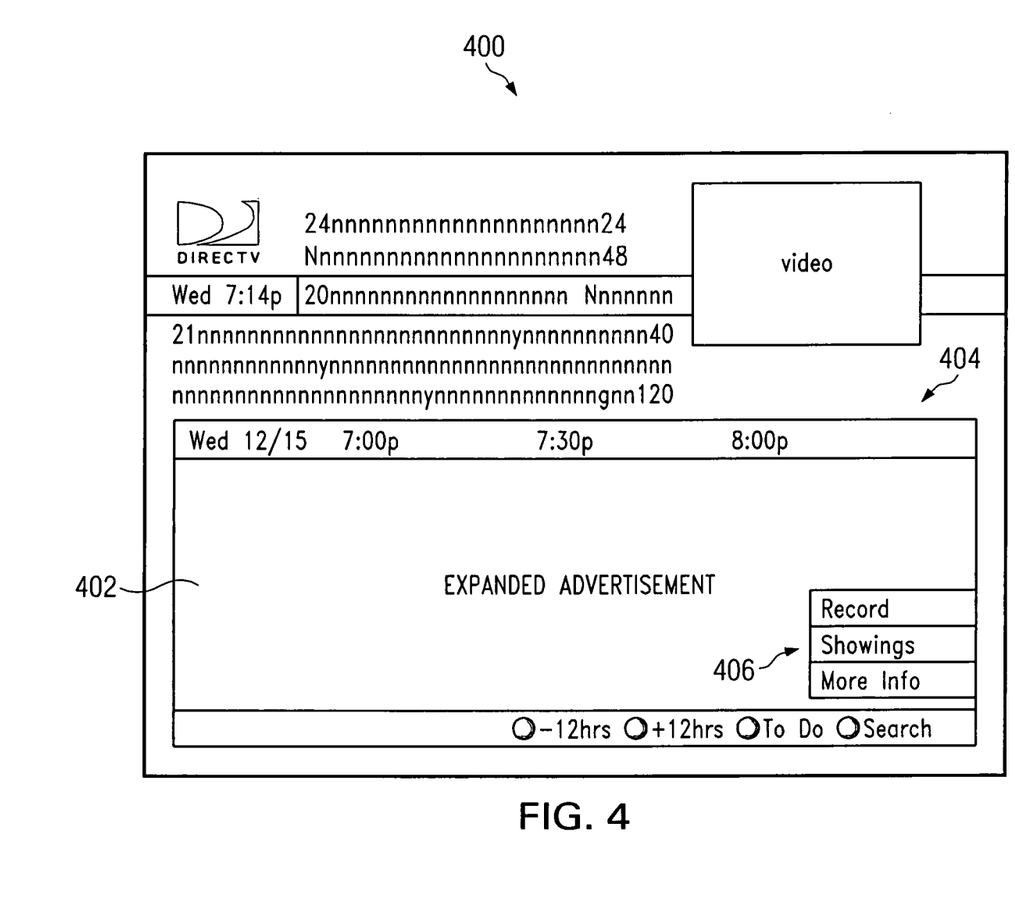
FIG. 4 shows an example program guide including an example expanded row advertisement.

Moreover, the advertisement 302 may be interactive. As mentioned above, an entry in the list 304 may be selected to activate various features of the user interface. Similarly, the advertisement may be selected to activate various features based on how the advertisement 302 is selected (i.e., what options or buttons are engaged when the selection is made). For example, if a highlighted advertisement in the program guide 300 is selected via a designated button (e.g., a 'Select' or 'Enter') on a remote control, the advertisement 302 may be expanded to occupy the entire list 304. FIG. 4 shows an example program guide 400 including an example expanded row advertisement 402. In this example, an entire list 404 is occupied by the selected advertisement 402.

Further, in an expanded state, the advertisement 404 may also include one or more on-screen buttons 406 to implement various system features. For purposes of illustration, the buttons 406 here are shown as 'Record,' 'Showings,' and 'More Info,' and the engagement of one of the buttons 406 may activate a corresponding function of scheduling a program for recording, displaying a screen of future showing, or displaying a screen of additional information regarding the program or event associated with the advertisement, respectively. Of course, the buttons 406 may include alternative functions such as, for example, a purchase option for pay-per-view events, a 'Play Now' option to allow the user to view the program if it is available on a storage device (e.g., the storage device 225 of FIG. 2) or currently being broadcast, an option to add the program to a queue for download (e.g., for an on-demand program described above in connection with FIG. 1), etc. Further, any of the functions described above or alternative features of the user interface may be activated by a designated button on an input device (e.g., a remote control) while the advertisement 302 or 402 is highlighted.

Figure 5:
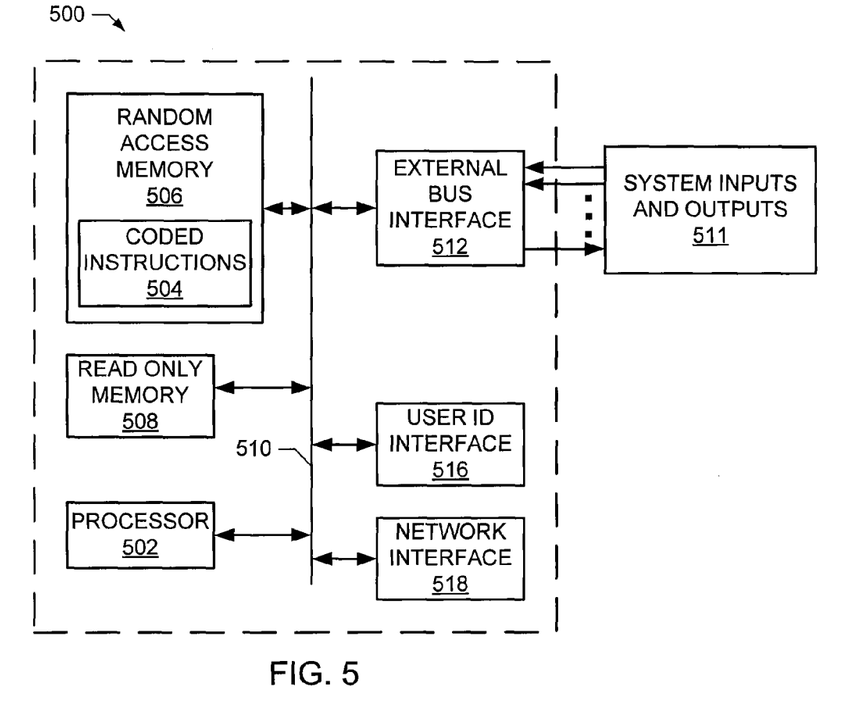
FIG. 5 illustrates an example manner of implementing an example processor unit

FIG. 5 is a schematic diagram of an example manner of implementing an example processor unit 500 to execute the example methods and apparatus described herein. The example processor unit 500 of FIG. 5 includes a general purpose programmable processor 502. The example processor 502 may execute, among other things, machine accessible instructions 504 (e.g., instructions present within a random access memory (RAM) 506 as illustrated and/or within a read only memory (ROM) 508) to perform the example processes described herein. The example processor 502 may be any type of processing unit, such as a microprocessor from the Intel® Pentium® family of microprocessors, the Intel® Itanium® family of microprocessors, and/or the Intel XScale® family of processors. The processor 502 may include on-board analog-to-digital (A/D) and digital-to-analog (D/A) converters.

The processor 502 may be coupled to an interface, such as a bus 510 to which other components may be interfaced. The example RAM 506 may be implemented by dynamic random access memory (DRAM), Synchronous DRAM (SDRAM), and/or any other type of RAM device, and the example ROM 508 may be implemented by flash memory and/or any other desired type of memory device. Access to the example memories 508 and 506 may be controlled by a memory controller (not shown) in a conventional manner.

To send and/or receive system inputs and/or outputs, the example processor unit 500 includes any variety of conventional interface circuitry such as, for example, an external bus interface 512. For example, the external bus interface 512 may provide one input signal path (e.g., a semiconductor package pin) for each system input. Additionally or alternatively, the external bus interface 512 may implement any variety of time multiplexed interface to receive output signals via fewer input signals.

To allow the example processor unit 500 to interact with a remote server, the example processor unit 500 may include any variety of network interfaces 518 such as, for example, an Ethernet card, a wireless network card, a modem, or any other network interface suitable to connect the processor unit 500 to a network. The network to which the processor unit 500 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 500 has been illustrated in FIG. 5, processor units may be implemented using any of a variety of other and/or additional devices, components, circuits, modules, etc. Further, the devices, components, circuits, modules, elements, etc. illustrated in FIG. 5 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A processor to implement a user interface, the user interface comprising:
   a program guide to aid a user to navigate a media presentation system including a list of entries that represent a plurality of programs;
   an advertisement slot positioned within the list of entries, wherein, when a subscription of the user includes a channel, the advertisement slot is to be populated, via the processor, within the list entries with a first advertisement including first content related to a first program of the plurality of programs available on the channel, and when the subscription of the user does not include the channel on which the first program related to the first advertisement is available, the advertisement slot is to be populated within the list of entries with a second advertisement including second content different from the first content, the second content including a message related to an addition of the channel on which the first program is available to the subscription of the user of the program guide.

2. A user interface as defined in claim 1, wherein the advertisement slot is expandable to occupy the entire list of entries.

3. A user interface as defined in claim 1, wherein the first and second advertisements are interactive to activate at least one feature of the user interface associated with the program guide.

4. A user interface as defined in claim 1, wherein a position of the advertisement slot is to scroll vertically in the program guide to correspond to a scrolling of the list of entries.

5. A user interface as defined in claim 1, wherein the advertisement slot is to be positioned relative to the first program.

6. A user interface as defined in claim 1, wherein the message related to the addition of the channel to the subscription of the user is to be provided by a content delivery system provider.

7. A user interface as defined in claim 1, wherein the advertisement slot is to be positioned in a hot spot of the program guide.

8. A user interface as defined in claim 1, wherein the first advertisement comprises a graphical representation of the first program.

9. A user interface as defined in claim 1, wherein the first and second advertisements are provided by a programming content provider associated with the channel.

10. A media presentation system, comprising:
    a transmission system capable of generating and transmitting streams of audiovisual data;
    a receiver capable of receiving audiovisual data and generating video and audio output signals, the receiver to:
       display a program guide comprising a list of entries that represent a plurality of programs on a display device;
       designate a position in the list of entries as an advertisement slot;

determine whether a subscription associated with the receiver includes a channel on which a first program related to a first advertisement is available;

when the subscription associated with the receiver includes the channel on which the first program is available, populate the advertisement slot within the list of entries with the first advertisement; and when the subscription associated with the receiver does not include the channel on which the first program is available, populate the advertisement slot within the list entries with a second advertisement different from the first advertisement, the second advertisement including a recommendation for an addition of the channel on which the first program is available to the subscription associated with the receiver.

11. A media presentation system as defined in claim 10, wherein the advertisement slot is expandable to occupy the entire list of entries.

12. A media presentation system as defined in claim 10, wherein the advertisement slot is to be selected to activate a feature associated with one of the receiver, the display device, or the transmission system.

13. A media presentation system as defined in claim 10, wherein the advertisement slot is to be positioned relative to the first program.

14. A media presentation system as defined in claim 10, wherein the first advertisement is provided by a programming content provider associated with the channel.

15. A media presentation system as defined in claim 10, wherein the second advertisement is provided by a content delivery system provider.

16. A method, comprising:

displaying, via a processor having a memory, a program guide including a list of entries that represent a plurality of programs to a user;

designating a position in the list of entries as an advertisement slot;

receiving a first advertisement including first content related to a first program of the plurality of programs to populate the advertisement slot;

determining whether a subscription of the user includes a channel on which the first program is available; and when the subscription of the user does not include the channel on which the first program related to the first advertisement is available, omitting the first advertisement from the advertisement slot and populating the advertisement slot within the list of entries with a second advertisement including second content different from the first content, the second content including information related to a process of adding the channel on which the first program is available to the subscription of the user.

17. A method as defined in claim 16, further comprising expanding the advertisement slot to occupy the entire list of entries.

18. A method as defined in claim 16, further comprising updating the advertisement slot after a predetermined time period.

19. A method as defined in claim 16, wherein the second advertisement related to the channel is provided by a content delivery system provider.

* * * * *